United States Patent
Russell et al.

(10) Patent No.: US 6,783,189 B1
(45) Date of Patent: Aug. 31, 2004

(54) WHEEL COVER WITH NOISE ABATEMENT RING

(75) Inventors: Martin E. Russell, Brentwood, TN (US); Richard McClanahan, White House, TN (US)

(73) Assignee: Zanini Tennessee, Inc., Birmingham, MI (US)

( * ) Notice: Subject to any disclaimer, the term of this patent is extended or adjusted under 35 U.S.C. 154(b) by 0 days.

(21) Appl. No.: 10/219,086

(22) Filed: Aug. 16, 2002

(51) Int. Cl.$^7$ .............................. B60B 7/00; B60B 7/12; B60B 7/14

(52) U.S. Cl. .............................. 301/37.12; 301/37.32; 301/37.375

(58) Field of Search .................... 301/37.101, 37.25, 301/37.102, 37.12, 37.371, 37.103, 37.106, 37.372–37.375, 37.42, 37.31, 4–6, 37.32, 37.34, 37.35, 37.36

(56) References Cited

U.S. PATENT DOCUMENTS

| | | | | |
|---|---|---|---|---|
| 2,162,732 A | * | 6/1939 | Lyon | 301/37.31 |
| 2,903,300 A | * | 9/1959 | Hurd | 301/37.12 |
| 3,397,918 A | * | 8/1968 | Aske, Jr. et al. | 301/37.42 |
| 3,397,920 A | * | 8/1968 | Aske, Jr. et al. | 301/37.42 |
| 3,671,076 A | | 6/1972 | Aske | |
| 4,291,921 A | | 9/1981 | Wulf | |
| 4,819,991 A | | 4/1989 | Ostrowski et al. | |
| 4,844,551 A | | 7/1989 | Hempelmann | |
| 4,895,415 A | * | 1/1990 | Stay et al. | 301/37.371 |
| 4,998,780 A | * | 3/1991 | Eshler et al. | 301/37.375 |
| 5,222,785 A | * | 6/1993 | Green | 301/37.371 |
| 5,346,288 A | | 9/1994 | Hodge et al. | |
| 5,393,128 A | * | 2/1995 | Sarmast et al. | 301/37.34 |
| RE35,497 E | * | 4/1997 | Carter, III | 301/37.43 |
| 5,641,824 A | * | 6/1997 | Forschirm | 524/317 |
| 6,017,096 A | | 1/2000 | Russell | |
| 6,030,049 A | * | 2/2000 | Russell | 301/37.375 |
| 6,305,755 B1 | | 10/2001 | Oblizajek | |

OTHER PUBLICATIONS

Material Data Sheets (delrin), www.wilmfibre.com, pp. 1–3.*

* cited by examiner

Primary Examiner—Russell D. Stormer
Assistant Examiner—Jason R. Bellinger
(74) Attorney, Agent, or Firm—Seth Natter; Natter & Natter

(57) ABSTRACT

A noise abatement ring having a low coefficient of friction is captured in an annular channel on the inner face of a wheel cover and abuts a vehicle wheel when the wheel cover is mounted to the wheel. The wheel cover is assembled by registering radial tabs formed on a wall of the channel and spaced from the base of the channel with notches formed in the ring and seating the ring into the channel. Thereafter, the ring is rotated relative to the wheel cover into a captive position, wherein the tabs and notches are no longer registered and with the tabs overlying reduced thickness stepped portions of the ring. A leaf spring latch, formed in one piece with the ring, seats into a detent on the inner face of the wheel cover to prevent rotation of the ring from the captive position.

17 Claims, 3 Drawing Sheets

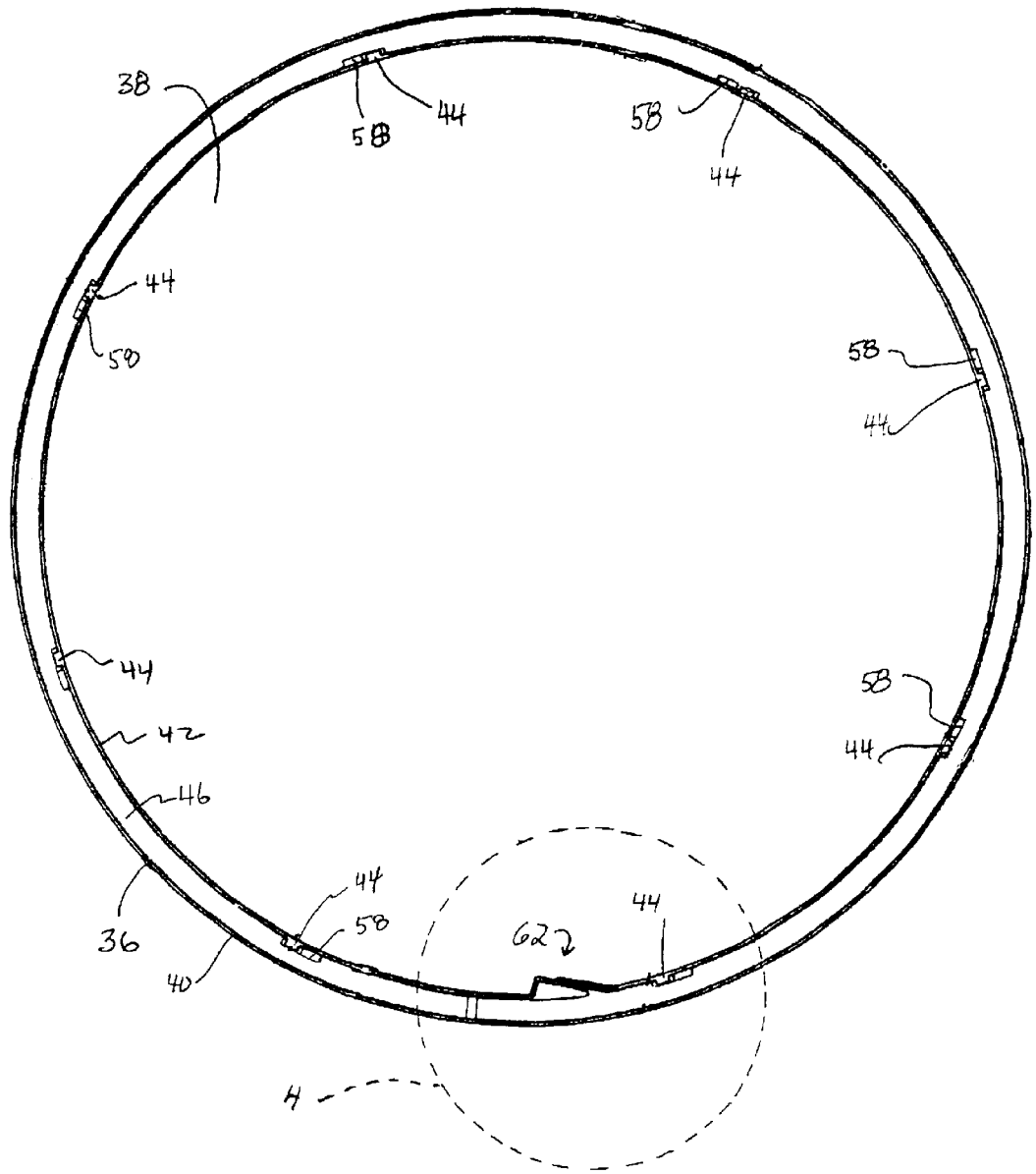

WHEEL COVER WITH NOISE ABATEMENT RING

BACKGROUND OF THE INVENTION

1. Field of the Invention

This invention relates generally to wheel trim and more particularly to a wheel cover having a noise abatement ring.

2. Antecedents of the Invention

Enhanced wheel appearance, not only in automobile wheels but, in addition, wheels of sport utility vehicles and trucks has been a continuing objective in both original equipment manufacturing and aftermarket industries.

While steel wheels have been the cost and weight efficient approach at providing requisite strength and utility, the appearance of stock steel wheels left much to be desired from an aesthetic standpoint. In automotive applications, manufacturers constantly strove to meet fuel efficiency goals while at the same time, sought to provide attractive appearance at low cost. Automotive manufacturers' attempts at achieving such objectives resulted in steel wheels to which light weight plastic wheel covers were mounted. The plastic wheel covers were generally injected molded and a variety of surface coatings were applied to the outer face of the wheel cover.

Various systems have been devised for mounting wheel covers to vehicle wheels. Mounting or retention systems employed retentive forces between the wheel cover and the wheel which were applied either in radial or axial directions.

Axial wheel cover retention systems have employed threaded caps to engage wheel mounting lugs projecting beyond the ends of lug nuts, as illustrated in U.S. Pat. Nos. 4,895,415 and 5,222,785. The caps were tightened against the ends of the lug nuts, inwardly flexing a central portion of the wheel cover while the periphery of the wheel cover abutted a peripheral edge of the wheel rim. The engagement between the wheel cover and the periphery of the wheel rim also resulted in rubbing contact and the generation of squeaking noises when the wheel rim moved relative to the wheel cover, e.g., when the wheel rim flexed.

In U.S. Pat. No. 6,305,755 there is found an analysis of the squeaking noises generated at contact sites between a plastic wheel cover and a wheel. One approach toward elimination of the squeaking noises was to space the peripheral edge of the wheel cover from the wheel rim itself by employing axial standoff legs which engaged the wheel rim at a flex free ridged hub portion, positioned radially inwardly from a tire seat portion of the rim, as disclosed in U.S. Pat. No. 6,017,096.

Other approaches included the employment of an annular cushioning member between the wheel cover and the rim, as exemplified by U.S. Pat. Nos. 5,346,288 and 4,844,551. The employment of cushioning materials proved unsatisfactory, however, since they were subject to undue wear.

In U.S. Pat. No. 6,305,755, there was suggested the employment of a relatively thin ring of acetal plastic noise inhibiting material on the inner face of a wheel cover at the sites of contact with a wheel. The noise inhibiting layer was to be co-injection molded with the wheel cover, formed of a different plastic such as, ABS. Such structure did not prove commercially feasible, however, perhaps due to the low coefficient of friction of the acetal plastic, which may have inhibited a co-injection molded bond with the wheel cover. Further, wear of the noise inhibiting layer mandated replacement of the entire wheel cover.

SUMMARY OF THE INVENTION

A wheel cover includes a noise abatement ring which is captured within an annular channel formed in the inner face of the wheel cover. The noise abatement ring is formed of a durable thermoplastic having high abrasion and frictional resistance such as, an acetal homopolymer.

The channel is positioned adjacent the periphery of the wheel cover and abuts a vehicle wheel when the wheel cover is mounted. Radial tabs are formed on a wall of the channel and project toward the opposite channel wall. The tabs overlie a base portion of the channel.

Notches formed in the ring are registered with the tabs projecting from the channel wall and the ring is seated in the channel and rotated into a captive position, wherein the tabs are no longer registered with the notches in the ring. The ring is maintained in its captive position and held against rotation in the reverse direction through engagement between an integral leaf spring latch, formed in one piece with the ring, and a detent formed in a channel wall.

From the foregoing compendium, it will be appreciated that is an aspect of the present invention to provide a wheel cover with a noise abatement ring of the general character described which is not subject to the disadvantages of the antecedents of the invention aforementioned.

It is a feature of the present invention to provide a wheel cover with a noise abatement ring of the general character described which is relatively low in cost.

A consideration of the present invention is to provide a wheel cover with a noise abatement ring of the general character described which is easy to assemble.

Another aspect of the present invention is to provide a wheel cover with a noise abatement ring of the general character described which may be shipped as components for final assembly at a vehicle dealer.

Another feature of the present invention is to provide a wheel cover with a noise abatement ring of the general character described wherein a wheel cover having a broken or worn noise abatement ring may be easily repaired.

A still further consideration of the present invention is to provide a wheel cover with a noise abatement ring of the general character described which inhibits squeaking noises which would otherwise be generated due to relative movement between a wheel cover and a vehicle wheel.

To provide a wheel cover with a noise abatement ring of the general character described which is well suited for economical mass production is yet a further aspect of the present invention.

Another feature of the present invention is to provide a wheel cover with a noise abatement ring of the general character described which is durable and capable of withstanding extensive usage without undue wear.

Yet another consideration of the present invention is to provide a wheel cover with a noise abatement ring of the general character described having a replaceable, low coefficient of friction surface in contact with a vehicle wheel.

To provide a wheel cover with a noise abatement ring of the general character described which readily withstands the high temperatures associated with a vehicle wheel is yet a further feature of the present invention.

Another consideration of the present invention is to provide a wheel cover with a noise abatement ring of the general character described which is lightweight and aids in achieving vehicle fuel efficiency goals.

To provide a wheel cover with a noise abatement ring of the general character described having a snap fit retention system for a noise abatement ring is yet a further aspect of the present invention.

Another feature of the present invention is to provide a wheel cover with a noise abatement ring of the general character described which aids in reducing vehicle maintenance costs.

Other aspects, features, and considerations in part will be obvious and in part will be pointed out hereinafter.

With these ends in view, the invention finds embodiment in the various combinations of elements, arrangements of parts and series of steps by which the aid aspects, features and consideration are attained, all with reference to the accompanying drawing and the scope of which will be more particularly pointed out and indicated in the appended claims.

BRIEF DESCRIPTION OF THE DRAWINGS

In the accompanying drawings in which is shown one of the various possible exemplary embodiments of the invention:

FIG. 2. is a reduced scale axial plan view of the inner face of the wheel cover, with a wheel cover retention system and vent openings deleted for clarity, and showing the noise abatement ring captured within an annular channel;

DESCRIPTION OF THE PREFERRED EMBODIMENT

Figure 1:
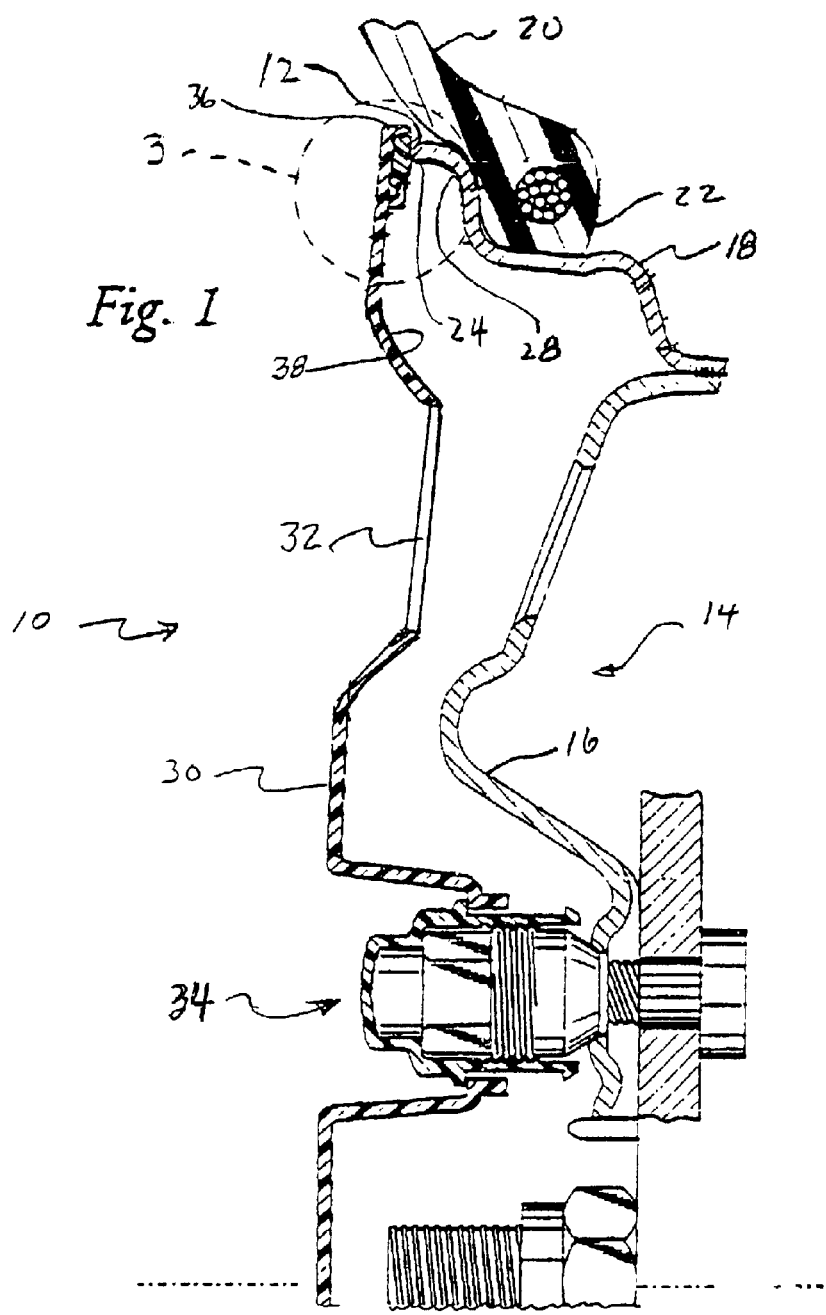
FIG. 1 is a fragmentary sectional view through a wheel carrying a tire and with a wheel cover and noise abatement ring constructed in accordance with and embodying the invention being mounted to the wheel.
Figure 5:
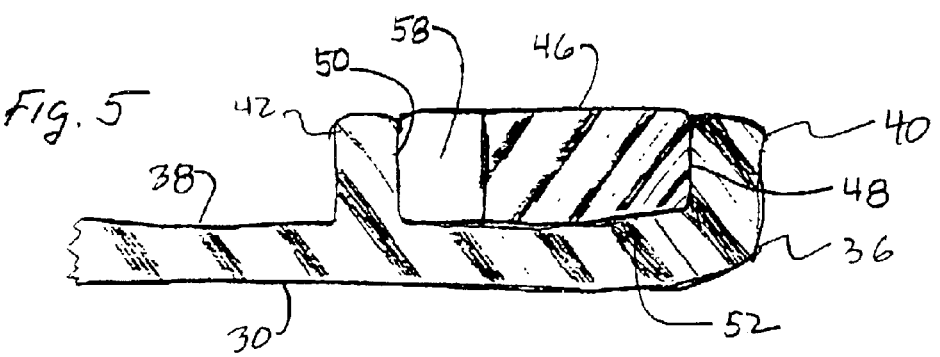
FIG. 5 is an enlarge scale fragmentary transverse sectional view through a peripheral portion of the wheel cover and though a notched portion of the ring, the same being taken substantially along the line 5—5 of FIG. 4.

With reference now to the drawings, the reference numeral 10 denotes generally a wheel cover carrying a noise abatement ring 12 in accordance with and embodying the invention. The wheel cover 10 is illustrated as being mounted to a vehicle wheel 14, with the wheel including a central wheel disc 16 and a wheel rim 18. Mounted to the rim 18, is a vehicle tire 20 having a tire mounting bead 22. The wheel rim 18 extends radially and axially outwardly, terminating at a peripheral edge lip 24, which defines the outer edge of a concave wheel weight channel 28.

The wheel cover 10 includes a body 30 having a plurality of conventional vent openings 32. The wheel cover 10 is mounted to the wheel 14 utilizing a conventional retention system such as an axial wheel cover retention system 34, more particularly disclosed in U.S. Pat. No. 4,998,780, incorporated herein by reference.

A circular peripheral edge 36 of the body 30 overlies and the wheel rim peripheral edge lip 24, as well as any wheel balance weights which may be carried in the wheel weight channel 28, clipped over the peripheral edge 24.

Pursuant to the invention, the noise abatement ring 12 is carried on an inner face 38 of the wheel cover body 30 in abutting contact with the peripheral edge lip 24, as well as any wheel balance weights. The noise abatement ring 12 is formed of a hard, durable thermoplastic having a low coefficient of friction, such that squeak free slipping engagement is provided between the wheel cover 10 and the wheel rim 18 during flexure of the wheel rim 18. Suitable thermoplastics for implementation in molding the ring 12 are acetal homopolymers, which are known to exhibit high strength, rigidity, excellent dimensional stability and resilience. Acetal homopolymers are available under the trademark DELRIN available from I.E. DuPont of Wilmington, Del.

Acetal homopolymers are well known for abrasion resistant qualities and generally provide a hard, e.g. Rockwell hardness R 120, smooth, slippery surface. The coefficient of friction of acetal homopolymers on steel is extremely low, i.e. 0.1 to 0.3 by inclined plane test, and the low coefficient of friction does not appreciably vary with temperatures up to 250° F. DELRIN acetal homopolymer containing fibers of TFE-fluorocarbon resin exhibits an even lower coefficient of friction, in the range of 0.05 to 0.15.

Acetal homopolymers also have excellent recovery from deflection producing loads, which renders them useful in snap fit assemblies such as will be described hereinafter with reference to a detent latch mechanism.

Pursuant to the invention, a channel is provided on the inner face of the wheel cover for mounting the noise abatement ring 12. A radially outer circular channel wall 40 extends axially inwardly from the wheel cover peripheral edge 36. An inner circular channel wall 42 is concentric to the wall 40 and the walls 40, 42, are spaced apart a radial distance sufficient to receive the radial width of the noise abatement ring 12.

Projecting radially outwardly from the inner wall 42 of the channel, is a plurality of equidistantly spaced tabs 44. The tabs 44 overlie the portion of the inner wheel cover face 38 which forms the base of the channel.

The noise abatement ring 12 comprises smooth, slippery contact face 46, a radially outer wall 48, a radially inner wall 50 and a bottom wall 52. As illustrated in, FIG. 2 and FIG. 4, the ring 12 may be split, having two spaced ends 54, 56 for dimensional stability when molding, for ease in assembly of the wheel cover and to assure proper seating within the channel during temperature changes A plurality of equidistantly spaced notches 58 extend radially from the inner wall 50 of the noise abatement ring 12. The notches 58 are dimensioned slightly larger than the channel tabs 44.

During assembly, the noise abatement ring 12 is registered between the channel walls 40, 42, with the notches 58 in alignment with the tabs 44. Thereafter the ring 12 inserted into the channel until there is abutting contact between the bottom wall 52 and the base of the channel.

Figure 3:
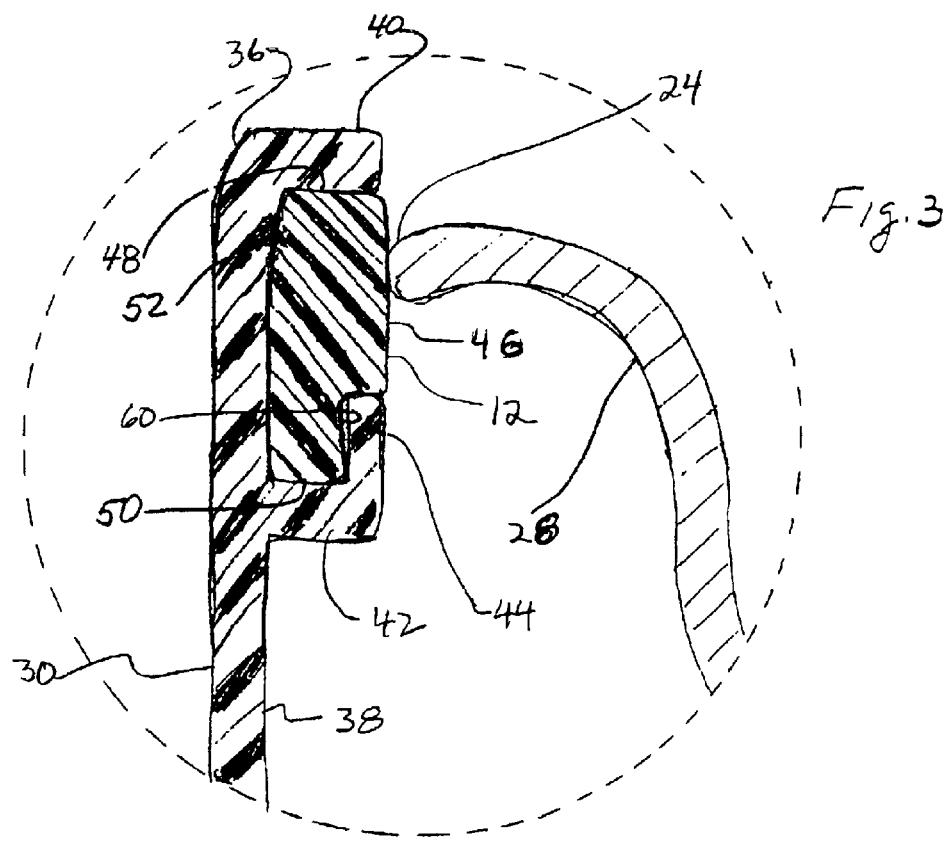
FIG. 3 is an enlarged scale partial sectional view through a portion of the wheel cover and wheel as illustrated in FIG. 1.
Figure 4:
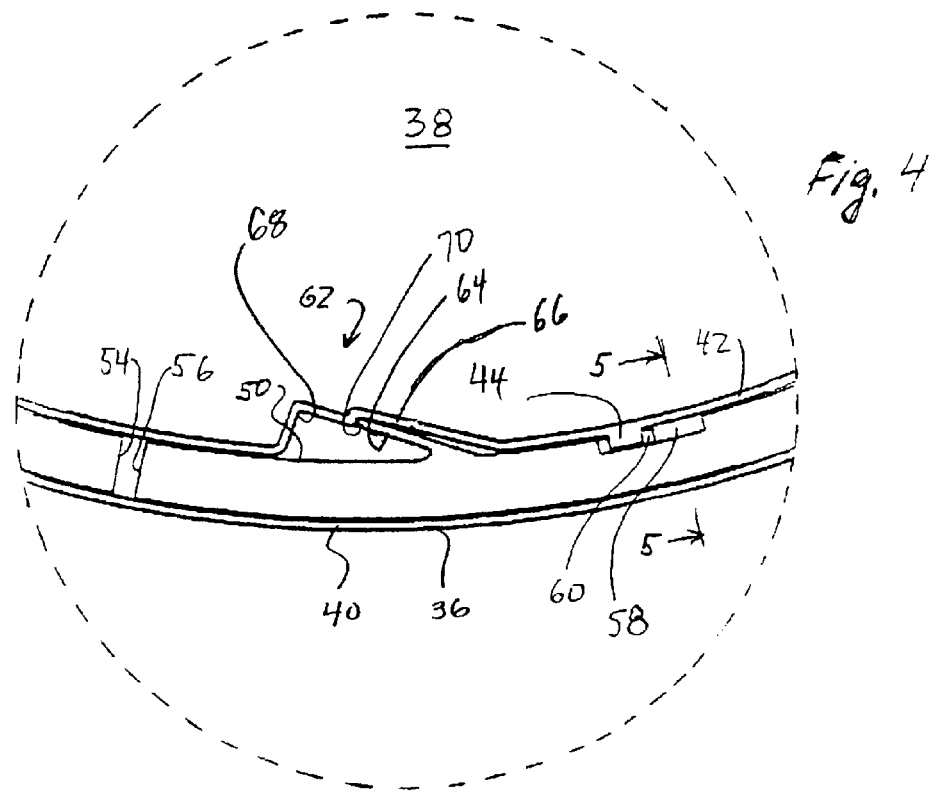
FIG. 4 is an enlarged plan view of the inner face of the wheel cover as illustrated in FIG. 2 and showing the noise abatement ring in its captured position, with a tab formed in a channel wall overlying a reduced thickness shelf formed in the ring and adjacent a notch and also illustrating a leaf spring latch formed in one peace with the ring in engagement with a detent of the wheel cover, to maintain the ring in its captured position.

The noise abatement ring 12 is then rotated in a counter-clockwise direction (as viewed in FIG. 2) relative to the wheel cover body 30, into a captive position, such that the tabs 44 are no longer registered with the notches 58. In order to facilitate such rotation, a reduced thickness step 60 is provided in the ring immediately adjacent each notch in a clockwise direction with respect to the notch. In the captive position, each tab 44 overlies a step 60, as best illustrated in FIG. 3 and FIG. 4.

A detent mechanism 62 is provided to maintain the noise abatement ring 12 in its captive position by preventing rotation of the ring 12 in a clockwise direction relative to the wheel cover 10. With reference to FIG. 4, wherein the detent mechanism 62 is illustrated, it should be noted that a unitary leaf spring latch 64, formed in one piece with the ring 12, projects angularly inwardly from the inner ring wall 50 at an angle of, for example, 20 degrees to a tangent.

It should also be noted that the inner wall 42 of the channel is formed with a two step angular detent 66. When the distal end of the leaf spring latch 64 is registered with a first step 68 of the detent, the tabs 44 and notches 58 will be in registration with one another such that the noise abatement ring 12 may be seated in the channel or removed therefrom.

As the ring is rotated counterclockwise relative to the wheel cover body 30, the leaf spring latch 64 is deflected radially outwardly, due to camming engagement between correspondingly sloped surfaces of the detent 66 and the leaf spring latch 64. When the noise abatement ring 12 is rotated to its full captive position, illustrated in FIG. 3 and FIG. 4, the distal end of the latch 64 clears the sloped surface of the first step 68 and springs radially inwardly in snap fit engagement against the clockwise end of a second step 70, which prevents rotation of the ring 12 in the opposite, clockwise direction.

If, for any reason, the noise abatement ring is to be removed or replaced, the leaf spring latch 64 may be deflected radially outwardly, with a thin instrument or tool, to clear the clockwise end of the second step 70. The ring 12 is then free to rotate in a clockwise direction.

Thus it will be seen that there is provided a wheel cover with noise abatement ring which achieves the various aspects, features and considerations of the present invention and is well suited to meet the conditions of practical usage.

As various possible further embodiments might be made of the present invention and as various changes might be made in the illustrative embodiment set forth above without departing from the spirit of the invention, it is to be understood that all matter herein described or shown in the accompanying drawings it to be interpreted at illustrative and not in a limiting sense.

Having thus described the invention, there is claimed as new and desired to be secured by Letters Patent:

1. A wheel cover suitable for mounting to a vehicle wheel, the wheel cover having a circular body, an outer face and an inner face, a retention system for mounting to the vehicle wheel, an annular channel formed on the inner face, a hard, durable, annular noise abatement ring captively retained in the channel, and a plurality of radial tabs engaging portions of the ring, the noise abatement ring having a slippery contact face, whereby when the wheel cover is mounted to the vehicle wheel, the slippery contact face is in registration with wheel contact surfaces for abatement of noises which would otherwise be generated upon relative movement between the vehicle wheel and the wheel cover.

2. A wheel cover suitable for mounting to a vehicle wheel as constructed in accordance with claim 1 wherein the tabs overlie portions of the ring.

3. A wheel cover suitable for mounting to a vehicle wheel as constructed in accordance with claim 2 wherein the rings includes a plurality of notches, each notch being adjacent a radial tab when the ring is captively retained, whereby the ring may be seated in the channel by registering the notches of the ring with the tabs of the wheel cover and thereafter rotated relative to the wheel cover to captively retain the ring in the channel.

4. A wheel cover as constructed in accordance with claim 3 wherein the ring includes reduced thickness step portions adjacent each notch, each tab engaging a reduced thickness step portion of the ring.

5. A wheel cover as constructed in accordance with claim 1 wherein the coefficient friction between the slippery contact face and a vehicle wheel fabricated of steel is not greater than 0.3, by inclined plane test.

6. A wheel cover as constructed in accordance with claim 1 wherein the slippery contact face has hardness in the order of R 120.

7. A wheel cover as constructed in accordance with claim 1 wherein the noise abatement ring is formed of acetal homopolymer.

8. A wheel cover as constructed in accordance with claim 3 further including a detent mechanism for preventing inadvertent rotation of the wheel cover to the position wherein the notches are registered with the tabs.

9. A wheel cover as constructed in accordance with claim 8 wherein the detent mechanism includes a leaf spring latch formed in one piece with the ring and a detent formed on the inner face of the wheel cover.

10. A wheel cover as constructed in accordance with claim 9 wherein the channel includes a pair of concentric walls and the detent is formed in one of the channel walls.

11. A method of providing substantially squeak free engagement between a wheel cover and a vehicle wheel wherein relative movement between the vehicle wheel and the wheel cover occurs during vehicle operation, the method comprising the steps of:

a) providing an annular channel on the inner face of the wheel cover, b) providing a hard, durable noise abatement ring dimension to be received in the channel, the ring having a slippery contact surface, and c) captively retaining the noise abatement ring within the channel by engaging portions of the noise abatement ring with tabs formed on the inner face of the wheel cover and d) mounting the wheel cover to the vehicle wheel with the slippery contact surface in engagement against portions of the vehicle wheel which move relative to the wheel cover during vehicle operation.

12. A method of providing substantially squeak free engagement between a wheel cover and a vehicle wheel in accordance with claim 11 wherein the noise abatement ring includes a plurality of notches, the step of captively retaining including i) registering the tabs of the wheel cover with the notches of the noise abatement ring, ii) inserting the noise abatement ring into the channel and iii) rotating the noise abatement ring relative to the channel.

13. A method of providing substantially squeak free engagement between a wheel cover and a vehicle wheel in accordance with claim 11 wherein the step of captively retaining the noise abatement ring in the channel includes rotating the noise abatement ring relative to the channel.

14. A wheel cover for a vehicle wheel, the wheel cover having a circular body, an outer face, an inner face, a retention system for mounting to the vehicle wheel and an annular channel formed on the inner face, the wheel cover further including a noise abatement ring, the noise abatement ring having a slippery contact surface for engagement with a wheel rim of the vehicle wheel, the contact surface having a coefficient of friction not greater than 0.3, by inclined plane test, and a hardness in the order of R 120, the noise abatement ring being seated in the channel with a plurality of tabs overlying portions of the ring.

15. A wheel cover as constructed in accordance with claim 14 wherein the noise abatement ring is fabricated of acetal homopolymer.

16. A wheel cover as constructed in accordance with claim 14 wherein the noise abatement ring is rotatably retained within the channel.

17. A vehicle wheel cover as constructed in accordance with claim 14 wherein the plurality of tabs extend from the channel.

* * * * *